United States Patent [19]

Koff

[11] 3,898,213

[45] Aug. 5, 1975

[54] SEPARATION OF α-AMINO-ω-LACTAMS

[75] Inventor: Fred W. Koff, Long Valley, N.J.

[73] Assignee: Allied Chemical Corporation, New York, N.Y.

[22] Filed: June 6, 1974

[21] Appl. No.: 477,132

[52] U.S. Cl. .... 260/239.3 R; 260/293.86; 260/326.5 FL; 260/267
[51] Int. Cl. ............................................. C07d 53/06
[58] Field of Search ............ 260/239.3 R, 326.5 FL, 260/293.86

[56] References Cited
UNITED STATES PATENTS
3,641,003  2/1972  Ito et al. ...................... 260/239.3 R Primary Examiner—Henry R. Jiles
Assistant Examiner—Robert T. Bond
Attorney, Agent, or Firm—Roger H. Criss; Arthur J. Plantamura

[57] ABSTRACT

A process of separating an α-amino-ω-lactam having the formula

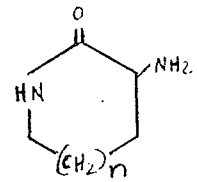

wherein $n$ is an integer from 0 to 12, from mixtures containing the same, which process comprises the steps of introducing carbon dioxide into a solution of the α-amino-ω-lactam in a solvent selected from the group consisting of aliphatic ketones containing 3 to 9 carbon atoms, $C_1$ to $C_4$ alkyl esters of $C_1$ to $C_6$ aliphatic carboxylic acids, linear and cyclic ethers and polyethers, chlorobenzene, toluene, chloroform, and mixtures thereof, to form a solid adduct; and separating the solid adduct from the solvent.

16 Claims, No Drawings

SEPARATION OF α-AMINO-ω-LACTAMS

BACKGROUND OF THE INVENTION

1. Field of the Invention

This invention relates to a method of separating α-amino-ω-lactams, particularly α-amino-ε-caprolactam, from mixtures containing the same as well as to novel adducts of such α-amino-ω-lactams, especially α-amino-ε-caprolactam.

2. Description of the Prior Art

Alpha-amino-ω-lactams are known compounds which have a variety of uses, such as precursors in the preparation of amino acids and as monomers useful in preparing copolymers with other lactams. In particular, α-amino-ε-caprolactam can be utilized to prepare the basic amino acid lysine, which is an excellent protein source and demand for which has been increasing rapidly. In the preparation of such aminolactams or their precursors, certain impurities are formed as by-products and for many operations these impurities must be eliminated from the aminolactam. Also, in the preparation of α-amino-ω-lactams, solutions containing the same are formed and it is required in certain subsequent operations to separate the amino-lactam from the solvent.

For instance, one manner of preparing α-amino-ε-caprolactam involves the Beckmann rearrangement of α-aminocyclohexanone oxime. In the preparation of the α-aminocyclohexanone precursors, certain impurities are formed such as octahydrophenazine. These impurities must either be eliminated from the system prior to the Beckmann rearrangement, which is a costly operation, or from the resulting α-amino-ε-caprolactam since a pure form of the α-amino-ε-caprolactam is necessary for a resolution-racemization technique used in the production of lysine. Moreover, in the preparation of α-amino-ε-caprolactam from α-aminocyclohexanone oxime, the α-amino-ε-caprolactam may be dissolved in a solvent as a result of neutralization of the Beckmann rearrangement mixture and the α-amino-ε-caprolactam must be isolated therefrom.

Previously suggested techniques for the separation of α-amino-ε-caprolactam from impurities include precipitation of the hydrochloride salt, recrystallization from certain solvents, liquid-liquid extraction and the like. However, such processes have disadvantages such as elimination of HCl from the solution, corrosion problems and difficult recovery of the free α-amino-ε-caprolactam from the salt in the case of hydrochloride formation and poor yields in the case of recrystallization. Furthermore, in some previously suggested techniques for the separation of α-amino-εcaprolactam from solvent mixtures, impurities in the system (such as octahydrophenazine in the case of α-amino-ε-caprolactam) remain with the α-amino-ε-caprolactam and must be subsequently eliminated therefrom.

It has also been suggested in U.S. application Ser. No. 215,961 filed Dec. 29, 1971 to Koff and Pisanchyn, entitled "Purification of Lysine Amide," now U.S. Pat. No. 3,819,699 that lysine amide can be separated from mixtures containing the same by adding carbon dioxide into a solution of the lysine amide in an organic solvent to form a solid adduct and separating the solid adduct from the solvent. Preferred solvents are alcohols with one to six carbon atoms, ethers such as dioxane or mono- and dialkyl ethers of glycols such as ethylene glycol dimethyl ether (i.e., glyme), and aromatic and alkyl aromatic hydrocarbons.

SUMMARY OF THE INVENTION

In accordance with this invention, there is provided a process of separating an α-amino-ω-lactam having the formula

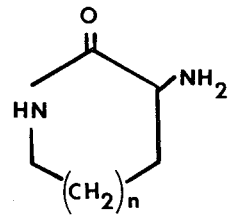

wherein $n$ is an integer from 0 to 12, from mixtures containing the same, which process comprises the steps of introducing carbon dioxide into a solution of the α-amino-ω-lactam in a solvent selected from the group consisting of aliphatic ketones containing 3 to 9 carbon atoms, $C_1$ to $C_4$ alkyl esters of $C_1$ to $C_6$ aliphatic carboxylic acids, linear and cyclic ethers and polyethers, chlorobenzene, toluene, chloroform and mixtures thereof, to form a solid adduct; and separating the solid adduct from the solvent.

It has been surprisingly found that only these solvents are suitable as a medium for forming the insoluble adduct. For example, whereas it has been previously suggested in the aforementioned U.S. patent application that organic solvents in general, and alcohols, ethers, aromatic hydrocarbons and alkyl aromatic hydrocarbons specifically, are effective media for the formation of an insoluble $CO_2$ adduct with lysine amide, it has been surprisingly found that most of these solvents are not suitable for the formation of an insoluble $CO_2$ adduct with α-amino-ω-lactams of the above formula, particularly α-amino-ε-caprolactam. As an example, the $CO_2$ adduct with α-amino-ω-lactams is not stable or does not form in such alcohols as methanol, ethanol, n-propanol or isopropanol. The adduct does not form when t-butanol, dimethyl formamide or pyridine are utilized as the solvent. Furthermore, when certain aromatics such as benzene and xylene are used as the solvent, a gelatinous material is formed rather than the desired solid adduct precipitate. Hence, of the large group of solvents suggested in the aforesaid application for separating lysine amide, it has been found that only glyme, dioxane and toluene are effective solvents for the preparation of a $CO_2$ adduct with α-amino-ω-lactams such as α-amino-ε-caprolactam. It has additionally been surprisingly found that aliphatic ketones of 3 to 9 carbon atoms, $C_1$ to $C_4$ esters of $C_1$ to $C_6$ carboxylic acids, chlorobenzene, toluene, and chloroform are likewise effective solvents for the present process.

This invention also provides novel solid adducts of α-amino-ω-lactams of the above formula with carbon dioxide; especially preferred is the solid adduct of α-amino-ε-caprolactam with carbon dioxide.

The solution containing the α-amino-ω-lactam may also contain certain impurities. These impurities are likewise soluble in the aforementioned solvents of this invention and as a result when the $CO_2$ adduct is separated from the solvent, these impurities remain in the filtrate. Accordingly, the process of this invention provides not only separation but purification of the α-amino-ω-lactams. For example, in the case of α-amino-ε-caprolactam, the octahydrophenazine impurity which may be present is soluble in the solvents of this invention and hence when the insoluble α-amino-ε-caprolactam-$CO_2$ adduct is separated from the solution, octahydrophenazine remains with the solvent.

DESCRIPTION OF THE PREFERRED EMBODIMENTS

As mentioned above, the process of this invention provides a manner of separating an α-amino-ω-lactam from a mixture containing the same. The α-amino-ω-lactam utilized herein has the formula

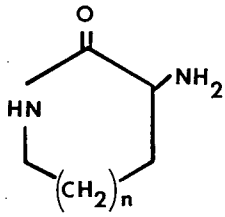

wherein $n$ is an integer from 0 to 12, preferably 1 to 8 and most preferably 2 (i.e., α-amino-ε-caprolactam). These aminolactams can be prepared by well-known techniques, such as by the Beckmann rearrangement of the corresponding α-aminocycloalkanone oxime. For example, α-amino-ε-caprolactam may be prepared by the Beckmann rearrangement of α-aminocyclohexanone oxime utilizing, for example, sulfuric acid. Exemplary of the α-amino-ω-lactams which are useful herein are the $C_4$ to $C_{12}$ aminolactams such as α-aminovalerolactam, α-amino-ε-caprolactam and α-aminooenantholactam.

The amino lactam to be separated is first dissolved in the solvents of this invention. Solvents which may be employed herein are (a) aliphatic ketones containing 3 to 9 carbon atoms such as acetone, methyl ethyl ketone and the like; (b) $C_1$ to $C_4$ alkyl esters of $C_1$ to $C_6$ aliphatic carboxylic acids such as ethyl acetate, n-butyl acetate and the like; (c) linear and cyclic ethers and polyethers such as alkyl and cycloalkyl mono and di-ethers of 2 to 12 carbon atoms; such as 1,2-dimethoxyethane (i.e., glyme), 1,4-dioxane, tetrahydrofuran and the like; (d) chlorobenzene; (e) toluene; (f) chloroform and (g) mixtures thereof. Preferred solvents include glyme, chlorobenzene, dioxane, tetrahydrofuran, acetone, toluene, ethyl acetate, n-butyl acetate, methyl ethyl ketone, chloroform and mixtures thereof.

The concentration of the resulting solution may be in the range of 0.5 to 45 percent, preferably 2 to 25 percent by weight. The aminolactam may already be in a solution of glyme, dioxane, chloroform, tetrahydrofuran or mixtures of glyme with toluene or chlorobenzene as a result of carrying out the neutralization of the Beckmann rearrangement mixture in such solvents as disclosed in cofiled U.S. application Ser. No. 477,131, filed June 6, 1974 of Baker, Fuhrmann, Koff and Pisanchyn entitled "Separation of α-Amino-ω-Lactams from Beckmann Rearrangement Mixtures." However, it is not necessary that the aminolactam be already in a solution of such solvents as the aminolactam prepared in any suitable manner can merely be added to and dissolved in the solvents of this invention. Preferably the resulting solutions are anhydrous as it has been found that small amounts of water result in lower yields as well as sticky precipitates.

The solution of aminolactam is contacted with carbon dioxide. Carbon dioxide is preferably in the form of a gas although alternatively the solid form may be employed. Preferably, carbon dioxide gas is bubbled into the solution. It is preferred to utilize an excess of carbon dioxide based on the amount of aminolactam in order to achieve complete precipitation; for example, the mole ratio of $CO_2$ to aminolactam may be at least about 1.05:1 to 1, and preferably may range from about 1.05:1 to 3:1. Upon contact with the solvent, an insoluble solid adduct is formed which precipitates out of the solution. It is believed that this adduct is a carbamate or its amine salt. The temperature during contact with the $CO_2$ is not critical and may range, for example, from about 0° to 60°C, preferably about 20° to 30°C. Similarly, the pressures utilized during the $CO_2$ introduction may vary widely and may range, for example, from about atmospheric to several thousand psig, preferably about atmospheric to 100 psig pressure of $CO_2$.

The $CO_2$ adduct is precipitated almost quantitively. Yields of the adduct based upon the amount of the aminolactam in solution may range for example from 60 to 100 percent. Additional adduct can be obtained by concentrating the filtrates resulting from this separation followed by additional contact with $CO_2$.

The insoluble adduct is thereafter separated from the solvent by any suitable physical means such as filtering, centrifuging, decanting and the like. It has been surprisingly found that impurities, such as octahydrophenazine in the case of α-amino-ε-caprolactam (present as a result of the preparation of α-aminocyclohexanone) do not form a $CO_2$ adduct and remain soluble in the solvents of this invention upon contact with the carbon dioxide. As such, they remain with the filtrate or the like. Accordingly, the process of this invention not only provides a convenient method of separating the aminolactam but also purifying the same.

The resulting aminolactam $CO_2$ adduct may be subsequently treated to free the aminolactam. The aminolactam may be regenerated from the adduct by, for example, acidification with a stronger acid than carbonic acid, such as hydrochloric acid, sulfuric acid, carboxylic acids such as acetic and formic acids and the like. Alternatively, the aminolactam may be regenerated by dissolving in a $C_1$ to $C_4$ alcohol, such as methanol, ethanol, isopropanol or t-butanol, or water and heating the solution to evolve carbon dioxide gas. The solvent may then be eliminated by conventional means, such as evaporating and the like. As another alternate means of regenerating the aminolactam in its free form, there may be carefully added to the adduct ammonium, sodium, potassium or calcium hydroxide in an amount just sufficient to react with the $CO_2$ to form the alkali or alkaline earth carbonate. The free aminolactam can then be extracted with a solvent from the carbonate and separated from the solvent by evaporation to dryness, etc. In the case of α-amino-ε-caprolactam, it is preferred that the $CO_2$ adduct be converted to the α-amino-ε-caprolactam hydrochloride since it is desired to have this salt form of the α-amino-ε-caprolactam for subsequent conversion to lysine. This may be accomplished, for example, by slurrying or dissolving the $CO_2$ adduct in glyme and adding anhydrous hydrochloric acid.

Subsequent to the $CO_2$ adduct formation and separation, the solvent (free of aminolactam and $CO_2$) may be recycled and utilized in previous steps performed in the production of the aminolactams. For example, the solvent (e.g., glyme) may be recycled for use in carrying out a neutralization of a Beckmann rearrangement mixture containing the aminolactam. Moreover, the impurities in the solvent need not be separated therefrom but instead recycled with the solvent so as to be enriched and hence more effectively removed from the system at a later stage. However, if desired, the impurities may be removed from the solvent prior to solvent recycling.

As mentioned above, the resultant aminolactams, in their free or salt form, have a wide range of utility. The preferred α-amino-ε-caprolactam can be hydrolyzed by known techniques to the amino acid lysine. Prior to hydrolysis, the α-amino-ε-caprolactam (in its free or preferably hydrochloride form) is preferably resolved and racemized by any suitable procedure to obtain the desired L-enantiomer which can be converted to L-lysine.

This invention also provides solid adducts of the aforementioned aminolactams with carbon dioxide. It is believed that the adducts are carbamates or their amine salts. The adduct with α-amino-ε-caprolactam, which is a white solid, is especially preferred since it can be utilized in the preparation of lysine. The above adducts have a mole ratio of about 0.5:1 to 1:1 moles of $CO_2$ per mole of aminolactam.

To further describe the process of this invention, the following non-limiting examples are given.

in the flask. The filtrate was acidified with an excess of a glyme/HCl solution and α-amino-ε-caprolactam hydrochloride was filtered, washed with glyme and pumped out in a vacuum oven at 60°C. The yield was 0.72 g (4.4m. moles) of the hydrochloride. The percent α-amino-ε-caprolactam $CO_2$ adduct soluble in glyme was 15.7% with 84.3% precipitating out. The results are shown in Table 1, below, as experiment 1.

EXAMPLE 2

Example 1 was repeated varying the concentration of the solution and the pressure of the $CO_2$ gas. The results are also shown in Table 1 as experiments 2–4. In experiment 4, the α-amino-ε-caprolactam was mixed with 0.261 grams of octahydrophenazine and the percent precipitated was based on the hydrochloride formed from the $CO_2$ adduct in a similar fashion. An analysis by thin layer chomotography revealed octahydrophenazine in the filtrate but not in the $CO_2$ adduct.

EXAMPLE 3

Example 1 was repeated utilizing chlorobenzene as the solvent. 8.21 grams of α-amino-ε-caprolactam were added to 100 cc. of chlorobenzene and 50 cc of chlorobenzene were subsequently added thereto. The results are reported in Table 1 as experiment 5.

As can be seen from Table 1, the yields of α-amino-ε-caprolactam precipitate were high when glyme was used as the solvent, ranging from 84.1 to 93.6 percent. The yield of recovered α-amino-ε-caprolactam with chlorobenzene solvent was somewhat lower (69.4%) but still acceptable.

Table 1

| Experiment | ACL[a] (grams) | (m.moles) | Solvent cc's | Concentration % w/v | $CO_2$ pressure psig | ACL.HCl in filtrate (grams) | (m.moles) | ACL—$CO_2$ adduct % soluble | % ACL[c] precipitated |
|---|---|---|---|---|---|---|---|---|---|
| 1 | 5.00 | 39 | Glyme 100 | 5 | 60 | 1.0 | 6.1 | 15.7 | 84.3 |
| 2 | 5.00 | 39 | Glyme 50 | 10 | 60 | 0.41 | 2.5 | 6.4 | 93.6 |
| 3 | 5.00 | 39 | Glyme 50 | 10 | atm. | 0.65 | 3.95 | 10.1 | 89.9 |
| 4 | 5.00+ 0.261OHP[b] | 39 | Glyme 75 | 6.7 | atm. | | | | 84.1[d] |
| 5 | 8.21 | 64.1 | Chlorobenzene 150 | 5.5 | atm. | 3.24 | 19.6 | 30.6 | 69.4 |

[a] ACL = α-amino-ε-caprolactam
[b] OHP = octahydrophenazine impurity
[c] % ACL precipitated determined from the volume of filtrate and ACL.HCl derived therefrom
[d] % ACL precipitated based on ACL.HCl obtained from ACL—$CO_2$ adduct

EXAMPLE 1

Into a Fisher and Porter 6 oz. aerosol compatability tube fitted with a stainless steel closure having a needle valve and a glass frit with a polytetrafluoroethylene sleeve inserted through the closure, were charged at room temperature (25°C) 5.00 grams (39m. moles) of α-amino-ε-caprolactam free base and 100 cc of glyme to obtain a 5% concentrated solution. The reactor was attached to a carbon dioxide gas cylinder provided with a pressure regulator and an excess carbon dioxide gas at 60 psig was introduced into the reactor. The flask was shaken for 3–4 minutes to insure good gas-liquid contact. White solids were observed to precipitate out of the solution. The flask was inverted and 72 cc. of liquid filtered off utilizing the carbon dioxide gas pressure

EXAMPLE 4

1.76 grams of α-amino-ε-caprolactam free base were dissolved at room temperature in 20 cc of dioxane, carbon dioxide gas was bubbled in and a solid adduct was observed to precipitate out of the solution. The example is repeated with 1.63 grams of α-amino-ε-caprolactam and 20 cc of tetrahydrofuran. A solid adduct was also observed to precipitate out of the solution.

EXAMPLE 5

Small amounts of α-amino-ε-caprolactam were dissolved in the following solvents at room temperature: acetone, toluene and n-butyl acetate. The toluene sample was first warmed to insure adequate dissolution and then cooled to room temperature. $CO_2$ gas was bubbled into the solutions and solid adducts were observed precipitating out of the solution.

EXAMPLE 6

Example 5 is repeated with ethyl acetate, methylethyl ketone, chloroform and mixtures of glyme with chlorobenzene and glyme with dioxane. Similar results are noted.

EXAMPLE 7

In these comparative examples, Example 4 was repeated with other solvents. 1.97g of α-amino-ε-caprolactam free base were dissolved in 20 cc of t-butanol at room temperature. $CO_2$ gas was bubbled in and no solid precipitate was formed. The example is repeated with 1.37g α-amino-ε-caprolactam and 15 cc dimethyl formamide. No solid precipitate was observed at room temperature or when the solution was cooled to −30°C. The example is again repeated with 1.20 g α-amino-ε-caprolactam in 15 cc isopropanol. No solid precipitate was observed at room temperature or when the solution was cooled to −35°C.

EXAMPLE 8

In this comparative example, Example 5 was repeated using pyridine as the solvent. No solid precipitate was observed at room temperature or after the solution was cooled to −25°C.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:
1. A process of separating an α-amino-ω-lactam having the formula

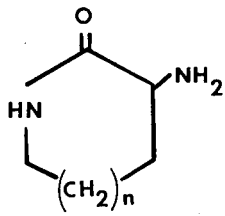

wherein $n$ is an integer from 0 to 12, from mixtures containing the same, comprising the steps of
introducing carbon dioxide into a solution of said α-amino-ω-lactam in a solvent selected from the group consisting of aliphatic ketones containing 3 to 9 carbon atoms, $C_1$ to $C_4$ alkyl esters of $C_1$ to $C_6$ aliphatic carboxylic acids, linear and cyclic ethers and polyethers, chlorobenzene, toluene, chloroform and mixtures thereof, to form a solid adduct; and
separating said solid adduct from said solvent.
2. The process of claim 1 wherein an excess of carbon dioxide gas is bubbled into said solution to form said adduct.
3. The process of claim 2 wherein the mole ratio of $CO_2$ to said α-amino-ω-lactam is at least about 1.05:1.
4. The process of claim 1 wherein $n$ is an integer from 1 to 8.
5. The process of claim 1 wherein said α-amino-ω-lactam is α-amino-ε-caprolactam.
6. The process of claim 1 wherein said solution has a concentration in the range of about 0.5 to 45 percent.
7. The process of claim 1 wherein said solid adduct is separated from said solvent by filtration, centrifugation or decanting.
8. The process of claim 1 wherein said α-amino-ω-lactam initially contains impurities and wherein said impurities remain in said solution after said solid adduct is separated from said solution.
9. The process of claim 1 wherein said α-amino-ω-lactam is regenerated from said solid adduct.
10. The process of claim 5 wherein said α-amino-ε-caprolactam is regenerated from said adduct as the hydrochloride.
11. The process of claim 5 wherein said α-amino-ε-caprolactam is regenerated from said adduct by dissolving said adduct in an alcohol or water and heating to evolve carbon dioxide gas.
12. The process of claim 1 wherein said solvent is selected from the group consisting of glyme, dioxane, tetrahydrofuran, acetone, methylethyl ketone, ethyl acetate, n-butyl acetate, chlorobenzene, toluene, chloroform and mixtures thereof.
13. A method of purifying an α-amino-ω-lactam containing impurities comprising the steps of
dissolving an α-amino-ω-lactam of the formula

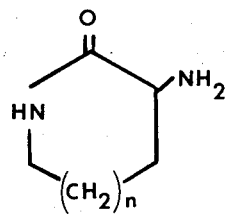

wherein $n$ is an integer from 0 to 12, in a solvent selected from the group consisting of aliphatic ketones containing 3 to 9 carbon atoms, $C_1$ to $C_4$ alkyl esters of $C_1$ to $C_6$ aliphatic carboxylic acids, linear and cyclic ethers and polyethers, chlorobenzene, toluene, chloroform and mixtures thereof,
introducing carbon dioxide into said solution to form a solid adduct, and
separating said solid adduct from said solvent.
14. The process of claim 13 wherein said α-amino-ω-lactam is α-amino-ε-caprolactam and said impurities comprise octahydrophenazine.
15. A solid adduct of an α-amino-ω-lactam of the formula

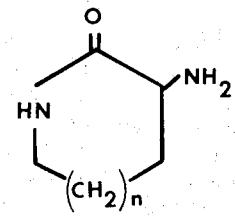

wherein $n$ is an integer from 0 to 12, with carbon dioxide.
16. The solid adduct of claim 15 wherein said α-amino-ω-lactam is α-amino-ε-caprolactam.

* * * * *